(12) United States Patent
Bhatt et al.

(10) Patent No.: US 8,296,198 B2
(45) Date of Patent: Oct. 23, 2012

(54) METHOD AND SYSTEM FOR DISTRIBUTION OF INFORMATION

(75) Inventors: Ankur Bhatt, New Delhi (IN); Ramprasadh Kothandaraman, Karnataka (IN)

(73) Assignee: SAP AG, Walldorf (DE)

( * ) Notice: Subject to any disclaimer, the term of this patent is extended or adjusted under 35 U.S.C. 154(b) by 933 days.

(21) Appl. No.: 11/769,719

(22) Filed: Jun. 28, 2007

(65) Prior Publication Data
US 2009/0006444 A1    Jan. 1, 2009

(51) Int. Cl.
G06Q 10/00    (2012.01)
G06F 7/00    (2006.01)

(52) U.S. Cl. .......................................... 705/28; 707/803

(58) Field of Classification Search .................. 705/28
See application file for complete search history.

(56) References Cited

U.S. PATENT DOCUMENTS

| | | | |
|---|---|---|---|
| 6,601,072 B1 * | 7/2003 | Gerken, III ............................ 1/1 |
| 6,859,919 B1 * | 2/2005 | Deffler et al. ................... 717/100 |
| 7,133,846 B1 * | 11/2006 | Ginter et al. ..................... 705/54 |
| 7,302,467 B2 * | 11/2007 | Matsuda et al. ............... 709/204 |
| 7,395,507 B2 * | 7/2008 | Robarts et al. ................. 715/744 |
| 7,428,503 B1 * | 9/2008 | Groff et al. ................... 705/7.25 |
| 7,487,191 B2 * | 2/2009 | Castro et al. ........................... 1/1 |
| 7,890,547 B2 * | 2/2011 | Hotti ................................ 707/803 |
| 2003/0009567 A1 * | 1/2003 | Farouk ............................ 709/229 |
| 2003/0023413 A1 * | 1/2003 | Srinivasa ........................... 703/2 |
| 2003/0163479 A1 * | 8/2003 | Mathews et al. ............... 707/102 |
| 2004/0068532 A1 * | 4/2004 | Dewing et al. ................. 709/200 |
| 2005/0060213 A1 * | 3/2005 | Lavu et al. ......................... 705/7 |
| 2005/0108633 A1 * | 5/2005 | Sahota et al. .................. 715/513 |
| 2005/0216401 A1 * | 9/2005 | Rines ............................... 705/40 |
| 2006/0059253 A1 * | 3/2006 | Goodman et al. ............. 709/223 |
| 2006/0143247 A1 * | 6/2006 | Poole et al. .................... 707/204 |
| 2006/0161635 A1 * | 7/2006 | Lamkin et al. ................. 709/217 |
| 2006/0294439 A1 * | 12/2006 | Rolia et al. ....................... 714/47 |
| 2007/0003023 A1 * | 1/2007 | Rolia et al. .................. 379/32.01 |
| 2007/0088838 A1 * | 4/2007 | Levkovitz et al. ............. 709/228 |
| 2007/0088852 A1 * | 4/2007 | Levkovitz ..................... 709/246 |
| 2007/0112676 A1 * | 5/2007 | Kontio et al. ................... 705/50 |
| 2007/0136327 A1 * | 6/2007 | Kim et al. ..................... 707/100 |
| 2007/0220107 A1 * | 9/2007 | Reisman ........................ 709/217 |
| 2007/0250826 A1 * | 10/2007 | O'Brien ......................... 717/162 |
| 2007/0250863 A1 * | 10/2007 | Ferguson ......................... 725/46 |
| 2007/0283410 A1 * | 12/2007 | Hsu .................................... 726/1 |
| 2008/0082959 A1 * | 4/2008 | Fowler ........................... 717/104 |
| 2008/0126221 A1 * | 5/2008 | Swanson ......................... 705/26 |
| 2008/0195649 A1 * | 8/2008 | Lefebvre ....................... 707/102 |
| 2008/0207182 A1 * | 8/2008 | Maharajh et al. .......... 455/414.1 |
| 2008/0216106 A1 * | 9/2008 | Maxwell et al. ................. 725/1 |
| 2008/0262901 A1 * | 10/2008 | Banga et al. ..................... 705/10 |
| 2008/0270433 A1 * | 10/2008 | Poole et al. .................... 707/100 |
| 2010/0169910 A1 * | 7/2010 | Collins et al. ................... 725/14 |
| 2011/0196659 A1 * | 8/2011 | Salle et al. ......................... 703/6 |

\* cited by examiner

Primary Examiner — Matthew Gart
Assistant Examiner — Ashford S Hayles

(57) ABSTRACT

A method and system for distribution of information is provided. A consumer metamodel definition for a device is created, wherein the consumer metamodel definition has consumer attribute. The consumer metamodel is then customized by editing the consumer attribute. A device inventory is then generated for the device by downloading a device information from a device information store, wherein the device has at least the consumer attribute of the consumer metamodel.

20 Claims, 6 Drawing Sheets

METHOD AND SYSTEM FOR DISTRIBUTION OF INFORMATION

TECHNICAL FIELD

Embodiments of the invention generally relate to computer systems, and more particularly, to a method and system for distribution of information.

BACKGROUND

Information distribution is needed in various scenarios to facilitate business operations. Typically, information is gathered from a plurality of sources, such as consumer and product databases, and sent to a number of devices such as computer terminals and personal digital assistants connected to a distribution system. The terms information and data shall be used interchangeably throughout the application. The distribution system, generally, identifies sets or clusters within a chunk of data and distributes the data to individual devices.

As the amount of information available to the distribution system grows, transferring the information in its entirety becomes increasingly burdensome. In addition, making all the information available to every device not only would hinder a user's ability to quickly locate the information that is needed to carry out his or her responsibilities, but also would place unnecessarily high requirements on the storage capacity and connection bandwidth of the receiving device.

A distribution system adapted to distribute only that information which is relevant to each of its consumers is both more efficient and practicable than the ones that transmit everything without discrimination. However, an inevitable side effect of this is that the information needed for each consumer can vary tremendously from one to another, and distribution systems must keep track of the differences. The terms device and consumer shall be used interchangeably throughout the application.

Current distribution systems accommodate targeted information distribution by using consumer attributes. Typically, the consumer attributes are the basic criteria based upon which consumers and the devices used by the consumers are differentiated from each other for information distribution purposes. For example the distribution system may be configured to identify the information to be distributed to a consumer on the basis of a consumer type and a consumer region. The consumer type and the consumer region are the consumer attributes. Based upon organizational requirements, distribution rules are typically created that identify the subset of information to be distributed to the consumers depending on the values of individual consumer attributes and combinations thereof. Using the distribution rules and the values of the consumer attributes for the individual consumers, a profile is then generally generated that tells a distribution system what information should be supplied to the consumer associated with it. When the consumer makes a request for information, the distribution system would read through the user's profile, retrieve the subset of information detailed by the profile, and send the subset of information to the device from which the user made the request.

The information needed by each consumer can be influenced by a range of factors, such as his or her job function, permission level, scope of operation and the like. Various sets of consumers connected to a single distribution system may have information distribution needs based upon different criteria. In addition, frequently changing organizational structures and business strategies constantly cause large scale data realignments.

Current distribution systems are provided with a fixed set of consumer attributes that are used to filter the information. The attributes are not customizable and thus providing ineffective filtering of data leading to the distribution of large amounts of redundant information to consumers and long synchronization sessions.

In addition, the current distribution systems provide no customization possibilities so as to enable individual consumers or applications to configure the consumer characteristics for a particular scenario in their landscape. Thus typically, a distribution system is restricted to distribution of information in a single scenario.

In current distribution systems, each consumer has to be manually created and registered, typically by an administrator. There is no way available in which consumers may be created and registered automatically. In scenarios where the distribution system is responsible for distribution of information to thousands of consumers, it is highly impractical and time consuming to manually create and register each consumer. Consumer information is typically maintained by each organization. The current distribution systems provide no means to automatically create consumers using this already existing information.

SUMMARY OF THE INVENTION

Embodiments of the invention are generally directed to a method and system for distribution of information. A consumer metamodel definition for a device is created, wherein the consumer metamodel definition has consumer attribute. The consumer metamodel is then customized by editing the consumer attribute. A device inventory is then generated for the device by downloading a device information from a device information store, wherein the device has at least the consumer attribute of the consumer metamodel.

These and other benefits and features of embodiments of the invention will be apparent upon consideration of the following detailed description of preferred embodiments thereof, presented in connection with the following drawings in which like reference numerals are used to identify like elements throughout.

BRIEF DESCRIPTION OF THE DRAWINGS

The claims set forth the embodiments of the invention with particularity. The embodiments of the invention, together with its advantages, may be best understood from the following detailed description taken in conjunction with the accompanying drawings. The invention is illustrated by way of example and not by way of limitation in the figures of the accompanying drawings. It should be noted that references to "an" or "one" embodiment in this disclosure are not necessarily to the same embodiment, and such references mean at least one.

DETAILED DESCRIPTION

Figure 1:
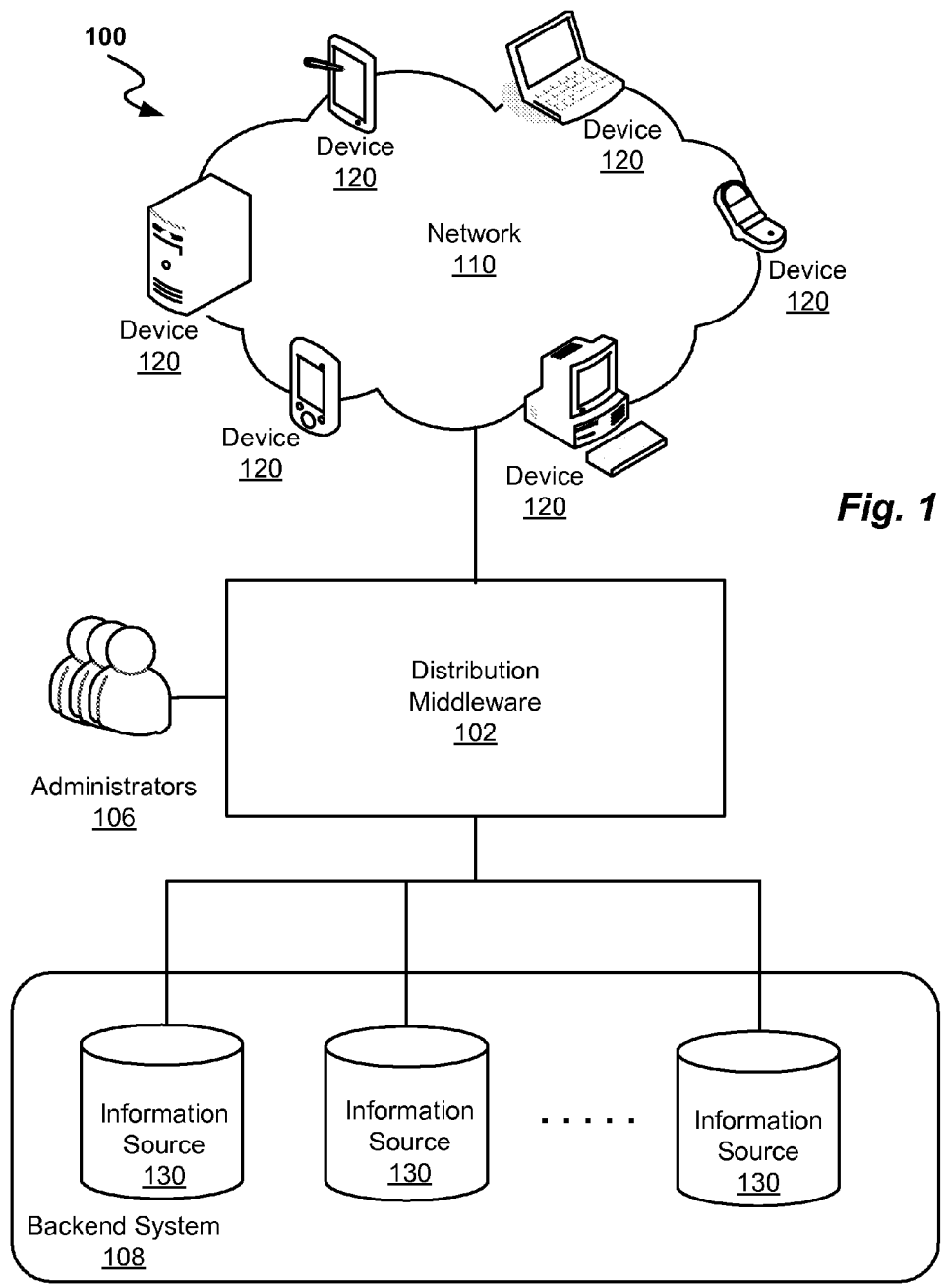
FIG. 1 is a block diagram of a typical distribution system according to an embodiment of the invention.

FIG. 1 is a block diagram of a typical distribution system 100 according to an embodiment of the invention. A number of devices 120 are connected to network 110. Network 110 connects devices 120 to backend system 108 through distribution middleware 102. Distribution middleware 102 is responsible typically for data consolidation and data distribution to devices 120. Each of the devices 120 has a set of consumer characteristics based upon which middleware 102 decides the subset of information to be distributed to device 120. Data consolidation generally includes collecting the data from backend system 108 based upon the consumer characteristics of devices 120 and storing the data. Data distribution generally includes extracting the data relevant to devices 120 from the consolidated data and actually distributing the consolidated data to devices 120. Distribution middleware 102 typically provides application tools to enable administrators 106 to configure distribution middleware 102 in order to provide a number of services. Configuration of distribution middleware 102 may include generation and registration of new devices 120, setting the consumer characteristics for each of the devices 120, configuration for providing device search services and the like. Backend system 108 may include a number of information sources 130 from which data may be collected and distributed by distribution middleware 102 to devices 120. Devices 120 may be selected from an array of devices such as servers, personal digital assistants, mobile phones, personal computers, laptops and the like.

Figure 2:
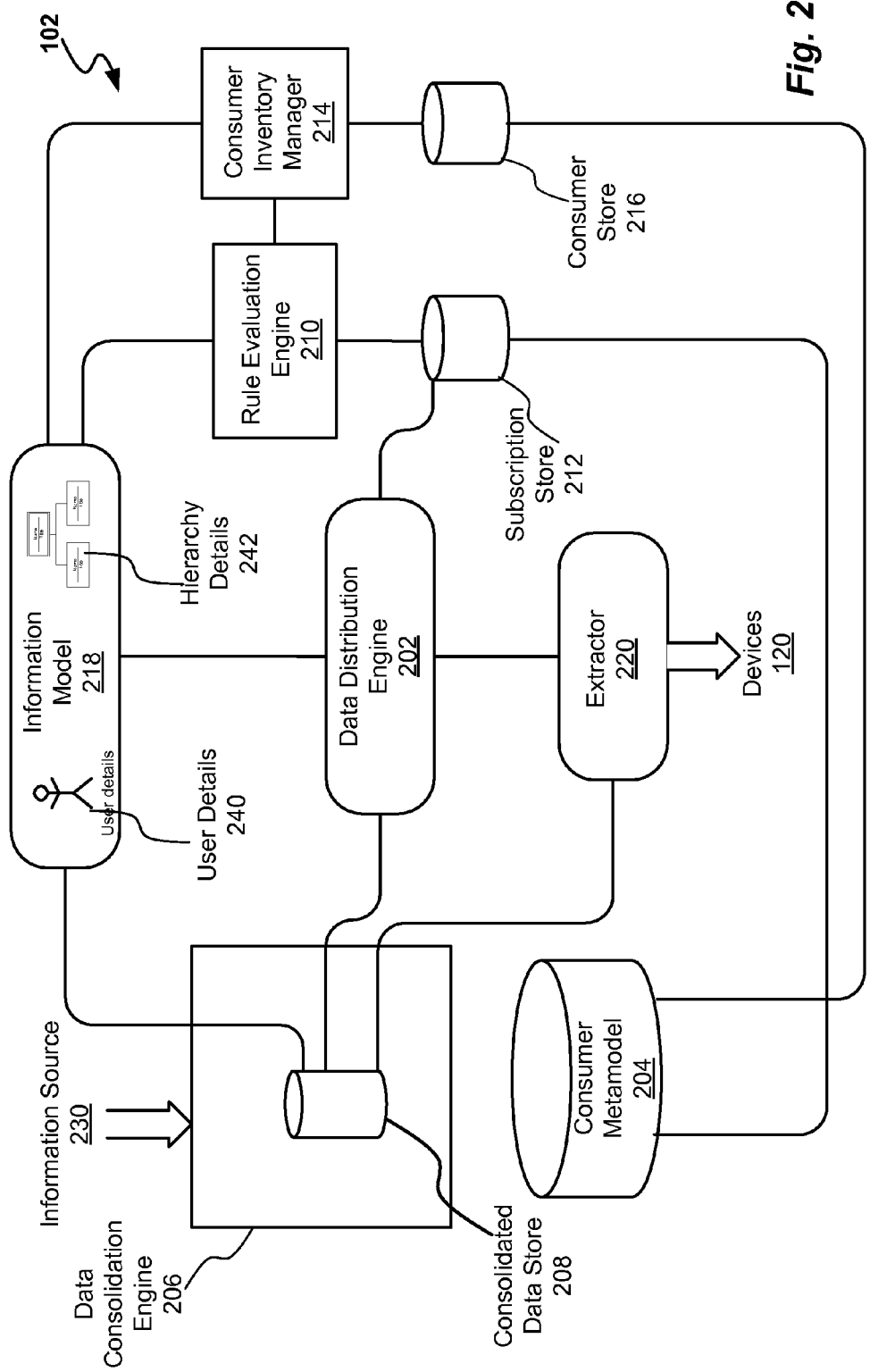
FIG. 2 is a block diagram of a data distribution middleware depicting data consolidation and data distribution according to an embodiment of the invention.

FIG. 2 is a block diagram of data distribution middleware 102 depicting data consolidation and data distribution according to an embodiment of the invention. Data consolidation engine 206 collects the data to be distributed to devices 120 from a number of information sources 230, consolidates the data and stores the consolidated data in consolidated data store 208. Information sources 230 may be either be part of the backend system 108 or any other external information source. As already mentioned in the last paragraph, data consolidation may be done based upon the consumer characteristics.

According to one embodiment of the invention, information model 218 essentially stores the consumer characteristics. Thus data consolidation engine 206 may access information model 218, read the consumer characteristics of each of the devices 120 and accordingly collect the data to be distributed to devices 120 from information sources 230. A few examples of consumer characteristics are user details 240, hierarchy details 242 such as organizational hierarchy, device type, device region, device location, device function and the like. All organizations typically maintain the consumer characteristics for each of the devices 120 internally. Information model 218 may store either the consumer characteristics for devices 120 itself or enable and facilitate access to such systems that maintain the consumer characteristics.

Consumer metamodel 204 stores the consumer characteristics for a set of devices 120 as a list of consumer attributes. Each of the devices 120 is an instance of consumer metamodel 204. For example, all mobile devices connected to distribution middleware 102 may have consumer metamodel 204 defining a list of attributes for the mobile devices. Distribution middleware 102 may have more than one consumer metamodel 204, each consumer metamodel 204 storing a list of consumer attributes for a separate set of devices 120.

Distribution middleware 102 may allow more than one consumer metamodel 204 to be active simultaneously. This may enable distribution middleware 102 to distribute the data to various sets of devices 120 classified using different sets of consumer attributes simultaneously. Each consumer metamodel 204 may have a set of devices 120 but each device 120 may belong to only one consumer metamodel 204. Each consumer metamodel 204 may have a name termed as a device category name. The device category name may be unique across systems and may be used to uniquely identify consumer metamodel 204. The consumer attributes essentially decide the criteria upon which data is to be distributed to a device 120. For example, if a set of devices 120 belong to a consumer metamodel 204 having the attributes device type, device region and device function, each of the set of devices 120 is distributed with data based upon the type of device 120, the region to which device 120 belongs to and the function device 120 performs. Thus the consumer attributes essentially enable filtering data before distribution to devices 120 and ensure that devices 120 receive only relevant and required data. Each consumer attribute may have more than one value. For example, in a consumer metamodel 204 for mobile devices, user identifier attribute may have more than one value whereas device type attribute may have only one value.

According to an embodiment of the invention consumer metamodel 204 may include four different types of attributes namely standard attributes, category attributes, configuration attributes and administration attributes. The standard attributes are the mandatory consumer attributes that each and every device 120 must include irrespective of consumer metamodel 204 it belongs to. The standard attributes are default attributes added to any new consumer metamodel 204 that is created via a consumer metamodel definition creation tool. The standard attributes are essential to enable distribution middleware 102 recognize a device 120. A few types of standard attributes may be as follows:

Device identifier—Distribution middleware 102 needs a unique identifier for each device 120 it can connect to. This unique identifier would be used internally for identifying device 120 and hence it would be a global unique identifier.

Device Category—Typically is the name of consumer metamodel 204 for a set of devices 120 and hence is referred to as the Device Category.

Device State—Typically maintains the state of devices 120 such as active, inactive, assigned and the like.

Category attributes are the consumer attributes specific to a category. These category attributes cannot be removed from consumer metamodel 204 they are defined for. But category attributes may not be present in each consumer metamodel 204. The category attributes need to be defined via the Consumer Metamodel Definition creation tool. A few examples of category attributes are as follows:

Device Name—Stores the names of devices 120.

Device Sub Category—Type of device 120 e.g. PDA or Laptop

Database Id—Database Id generated at device 120. Helps in the communication handshake between distribution middleware 102 and Device 120.

User identifier—Typically identifies the user using device 120. Off coarse it may be possible for a set of users to use the same physical device 120 hence the set of users may end up sharing the device identifiers. Thus the user identifier attribute may allow multiple values in order to maintain the set of users. An important thing to note here is that a single user identifier may also be assigned to separate device identifiers.

Installed Software Component—The software components that are installed on devices 120. This attribute may also have a set of values since a set of software components may be installed on each device 120.

Equipment Number—The equipment number of Devices 120 as maintained.

Device Framework Type—Typically stores the information about a client framework.

Client-communication framework may have additional tables for internal purposes (e.g. RFC queues and their properties, code page information, etc). These may also be integrated and defined as Configuration Attributes.

Configuration attributes are the consumer attributes that are used for data distribution configuration purposes. Once defined in consumer metamodel 204, the configuration attributes may be available for data distribution modeling and may be used for device generation, distribution rules generation and device subscription generation purposes. Examples of configuration attributes may be installation identifier and position identifier. The configuration attributes once defined may be visible to the user and may be maintained. The configuration attributes may be defined via the Consumer Metamodel Definition Creation Tool.

While managing a large number of devices 120, administrators may want to tag devices 120 with attributes that make search for devices 120 faster. These attributes are generally referred to as administration attributes. The administration attributes are the consumer attributes that may be used by the user for better manageability purposes. The administration attributes may either be defined directly by the users in an administration portal or via the Consumer Metamodel Definition creation tool. The Administration attributes may be defined only for a single device 120 or set of devices 120. The administration attributes need not result in a change in consumer metamodel 204 and hence need not be maintained for all devices 120. It may be possible to define the administration attributes via the Consumer Metamodel Definition Creation Tool. In such a case the administration attributes are maintained as part of consumer metamodel 204 and hence would apply to all devices 120.

The information about devices 120 that require data distribution from information sources 230 along with their corresponding consumer attributes is stored in consumer store 216. Consumer store 216 essentially stores device information in the form of a list of devices 120, a list of consumer attributes for each device 120 based on consumer metamodel 204 to which device 120 belongs to and one or more values of each consumer attribute. Consumer store 216 typically stores information about devices 120 in a tabular format. Although a person skilled in the art may appreciate that data may be stored in various alternative manners. Consumer inventory manager 214 coordinates with information model 218 and consumer metamodel 204 to generate the device information and store the device information in consumer store 216.

An integral part of maintaining consumer store 216 is a device registration process. The device registration process essentially assigns a device identifier to each of the devices 120. Devices 120 may be entered or listed in consumer store 216 only after devices 120 undergo the device registration process and are assigned with device identifier. As the number of devices 120 increase, it may be humanly impossible to create, register and maintain devices 120 manually. Information model 218 may either store the device information for devices 120 itself or enable and facilitate access to such systems that maintain device information. Thus consumer inventory manager 214 may download device information provided by information model 218 for mass registration of devices 120. The device information may include consumer attributes and values of the consumer attributes. The device information may also be downloaded from a data object storing device information. During the receiver registration process, some of the consumer attributes for devices 120 may be marked as read-only. Marking a consumer attribute as read-only may imply that the consumer attribute is mandatory for device 120 and that an administrator is not allowed to delete the mandatory consumer attribute from the device information. The device registration process may also allow one or more default values to be allocated to a consumer attribute of device 120.

Rule evaluation engine 210 typically calculates the data to be distributed to devices 120 based upon the consumer attributes, values for consumer attributes and a set of distribution rules. Rule evaluation engine 210 generates a subscription for each device 120. The distribution rules are typically maintained by an organization and identify the subset of information to be distributed to devices 120 depending on the individual consumer attribute values and combinations thereof. Thus the subscription of device 120 exactly indicates the subset of information that needs to be distributed to devices 120. The subscriptions are stored in subscription store 212.

Data distribution engine 202 is responsible for receiving consumer requests for data distribution, checking and validating consumer and device authorizations, communicating with subscription store 212 and pulling out subscription for devices 120 that are requesting data distribution. Based upon the device subscriptions, extractor 220 extracts required data from consolidated data store 208. The extracted data is then distributed to devices 120.

Figure 3:
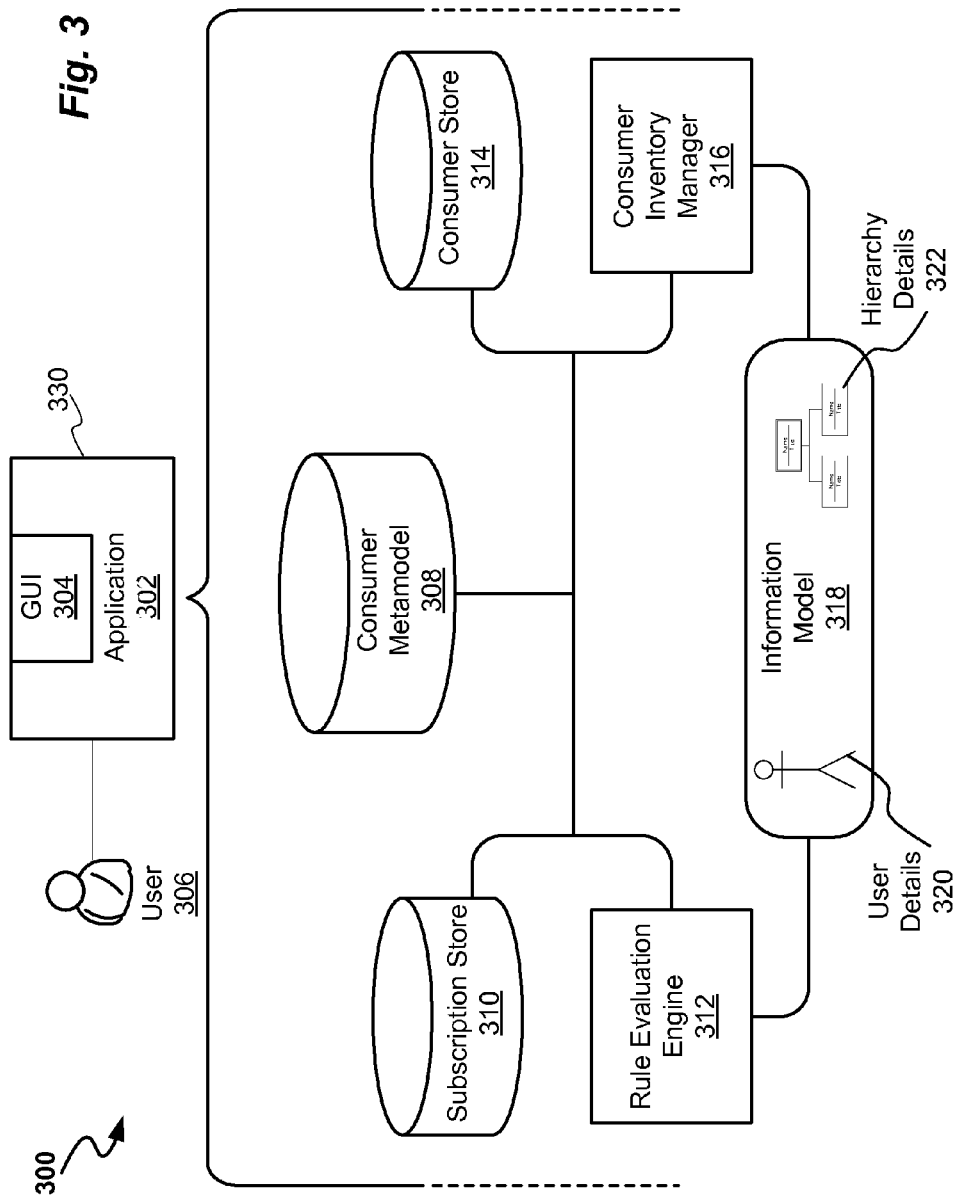
FIG. 3 is a block diagram of a customizable system for data distribution according to an embodiment of the invention.

FIG. 3 is a block diagram of a customizable system 300 for data distribution according to an embodiment of the invention. Distribution middleware 102 typically provides user 306 of device 330 with application tool 302 for modeling consumer metamodel 308. Application tool 302 may include the consumer metamodel definition creation Tool. Modeling consumer metamodel 308 includes maintaining or customizing the consumer attributes of consumer metamodel 308 by editing the consumer attributes. The consumer attributes defined as a part of consumer metamodel 308 may be maintained for all one or more devices 330 which are part of consumer metamodel 308. The maintenance of consumer attributes may be done through a programming logic or graphical user interface (GUI) 304. Application tool 302 may also allow marking of one or more consumer attributes as read-only so that such consumer attributes are not displayed to user 306 for customizing. GUI 304 may be generic enough to display the consumer attributes of more than one consumer metamodel 308 within a single user screen for maintenance. Application tool 302 may also provide a capability to search for one or more devices 330 using consumer metamodel definitions and thus providing a generic search concept over the consumer attributes defined. Application tool 302 may also enable user 330 to access consumer store 314 to view device 330 and the related consumer information. In addition, application tool 302 may enable access to subscription store 310 and view data distribution details of device 330. As discussed in the previous paragraphs, consumer inventory manager 316 coordinates with information model 318 (having consumer characteristics such as user details 320 and hierarchy details 322) and consumer metamodel 308 to generate the device information and store the device information in consumer store 314. Rule evaluation engine 312 typically calculates the data to be distributed to device 330 based upon the consumer attributes, values for consumer attributes and a set of distribution rules. Rule evaluation engine 312 generates a subscription for device 330.

Figure 4:
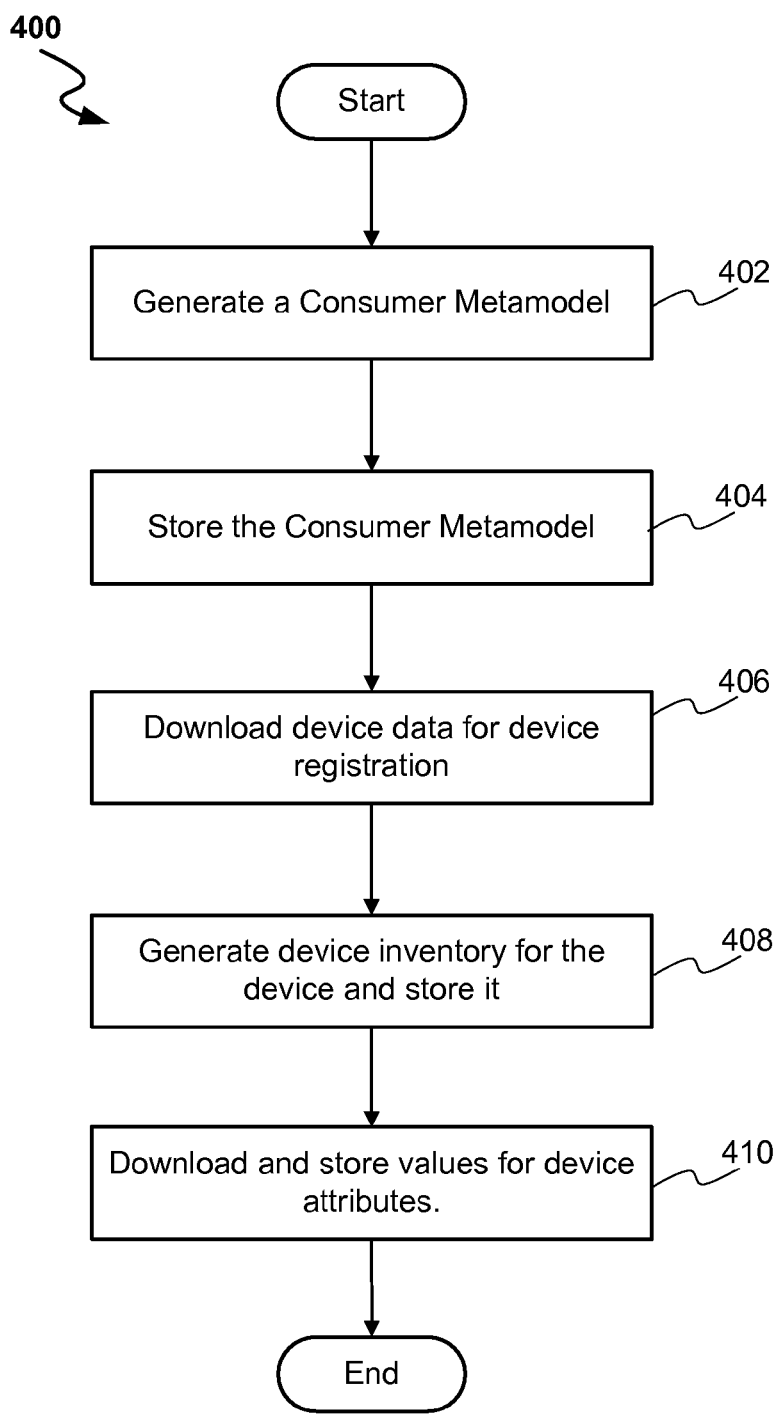
FIG. 4 is a flow diagram of a data distribution process according to an embodiment of the invention.

FIG. 4 is a flow diagram of a data distribution process 400 according to an embodiment of the invention. In process block 402, a new consumer metamodel 204 is generated. Consumer metamodel 204 may either be generated manually by user 306 or automatically generated based upon system configuration. In process block 404, consumer metamodel 204 is stored in a memory. Process 400 then moves to process block 406, wherein the device data for devices 120 is downloaded from information sources 230 for device registration purposes and data maintenance. The device data is typically either stored by information model 218 or made available from external systems through information model 218. In process block 408, a device inventory, referred to as consumer store 216 in previous paragraphs, is generated for devices 120 and stored. The consumer store 216 is generated either manually or automatically based upon downloaded device data. Each device is created in consumer store 216 one by one by entering the consumer attributes of device 120. The consumer attributes may include the consumer attributes of consumer metamodel 204 of which device 120 is a part and default attributes for the device. In decision block 410, the values of consumer attributes are downloaded from the external systems and stored against the corresponding device consumer attributes. Process 400 is then terminated.

Figure 5:
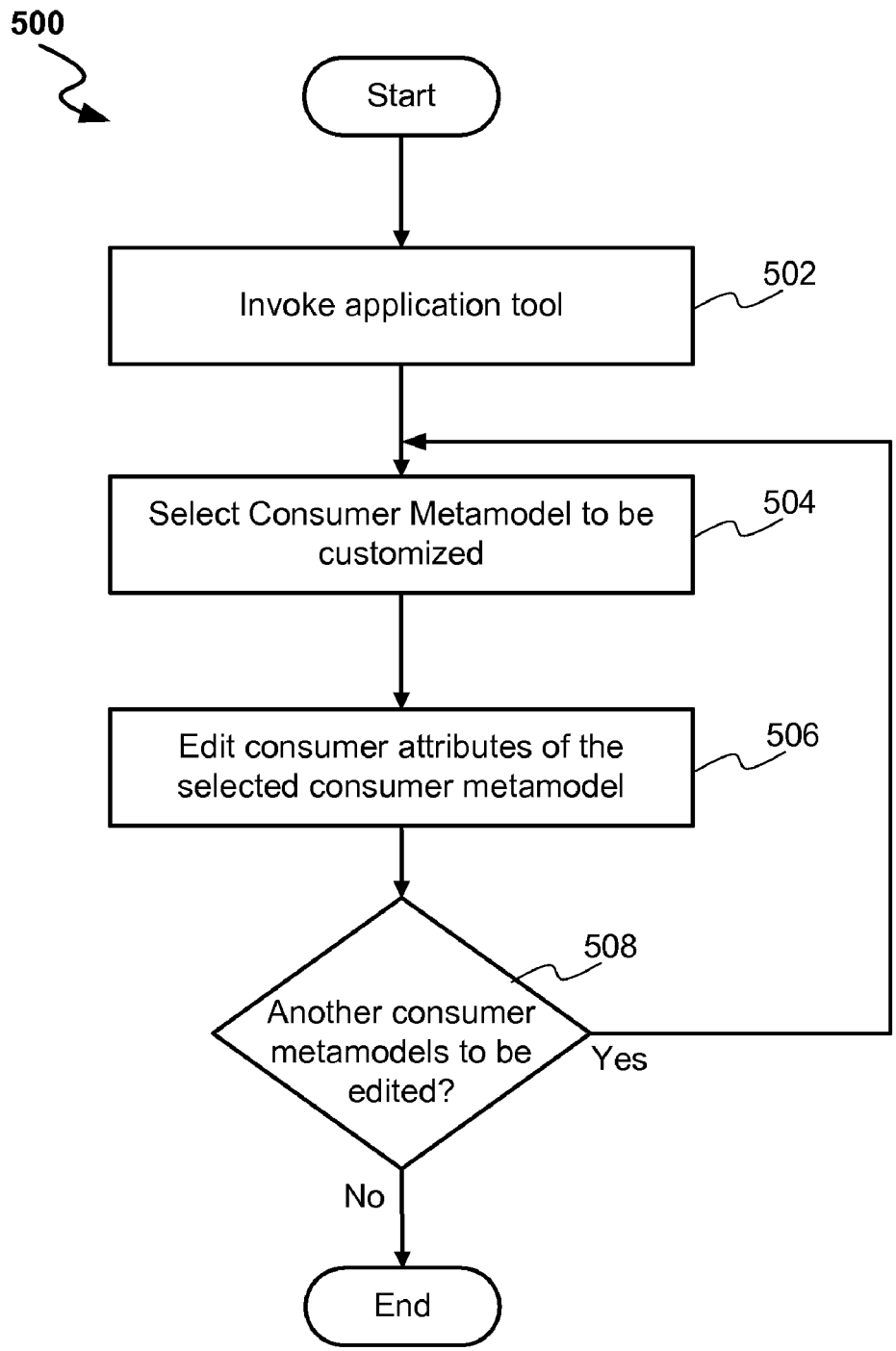
FIG. 5 is a flow diagram of a process for customizing consumer attributes according to an embodiment of the invention.

FIG. 5 is a flow diagram of a process 500 for customizing consumer attributes according to an embodiment of the invention. Application tool 302 is invoked in process block 502. In process block, 504, consumer metamodel 204 is selected for customization. Process 500 then moves to process block 506 wherein the consumer attributes of the selected consumer metamodel 204 are edited. In decision block 508, if there are anymore consumer metamodels 204 to be edited, process 500 is directed to process block 504 where user 306 is given a choice to select another consumer metamodel 204. In decision block 508, If there are no more consumer metamodels to be edited, process 500 is terminated.

Figure 6:
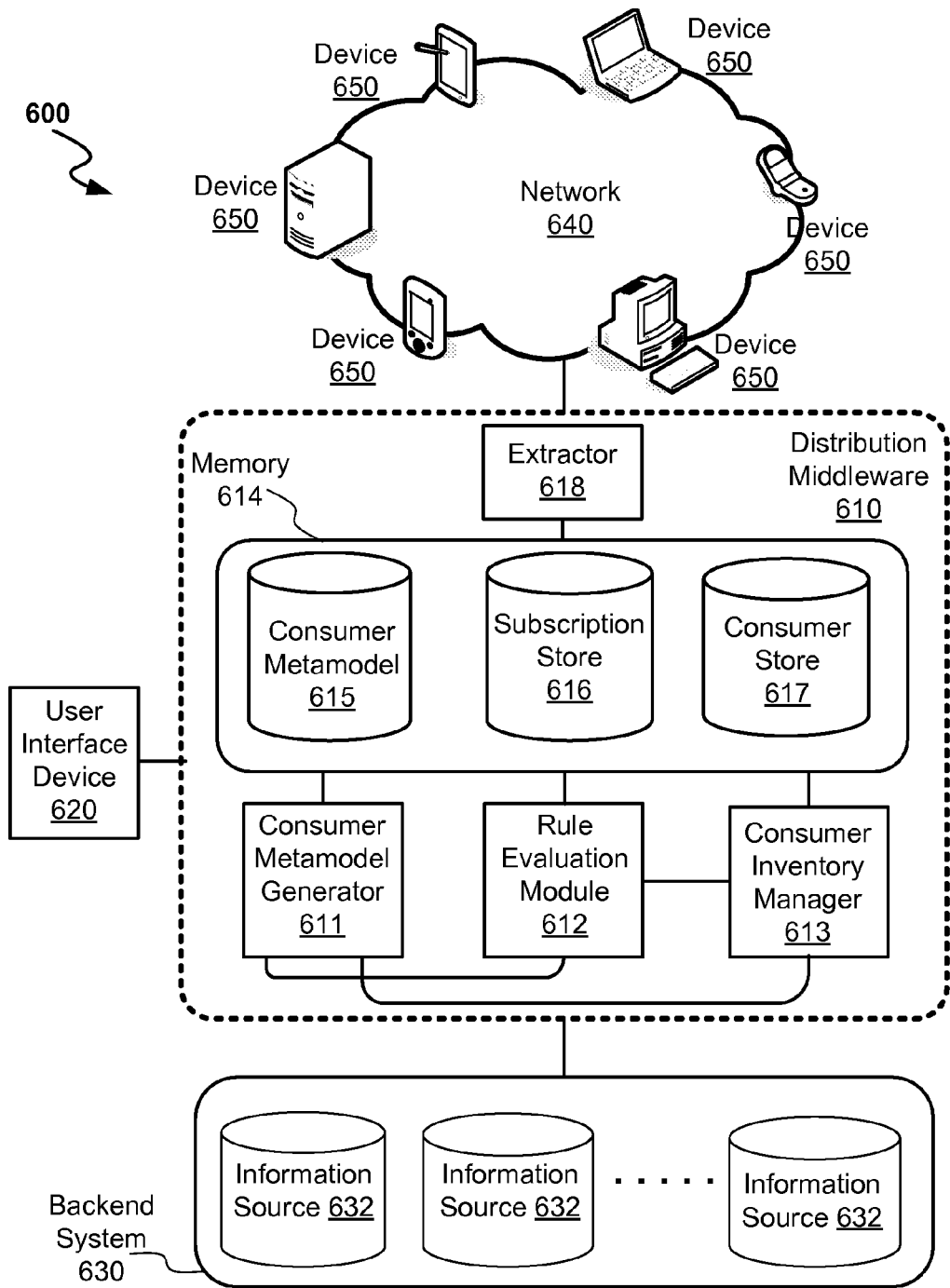
FIG. 6 is a block diagram of an exemplary implementation of a distribution system according to an embodiment of the invention.

FIG. 6 is a block diagram of an exemplary implementation of a distribution system 600 according to an embodiment of the invention. System 600 typically includes network 640 connecting a one or more devices 650, distribution middleware 610, backend system 630 and user interface device 620. Network 640 typically connects devices 650 to backend system 630 through distribution middleware 610. Distribution middleware 610 is generally responsible for data consolidation and data distribution to devices 650. Each device 650 has a set of consumer characteristics based upon which distribution middleware 610 decides the subset of information to be distributed to devices 650.

Distribution middleware 610 typically provides application tools to enable administrators to configure distribution middleware 610 to provide a number of services to the user. Distribution middleware 610 generally provides the services to the user through user interface device 620. Configuration of distribution middleware 610 may include generation and registration of new devices 650, setting consumer characteristics for each of the devices 650, configuration for providing a search function for devices 650 search and the like. Backend system 630 may include a number of information sources 632 from which data may be collected and distributed by distribution middleware 610 to devices 650. Devices 650 may be selected from an array of devices such as servers, personal digital assistants, mobile phones, personal computers, laptops and the like.

Distribution middleware 610 typically includes memory 614, consumer metamodel generator 611, rule evaluation module 612, consumer inventory manager 613 and extractor 618. Data requiring distribution to devices 650 is collected from information sources 632 based upon user and device characteristics. This collecting of data is typically referred to as data consolidation. The consolidated data is stored in a consolidated data store (not shown). The consolidated data store is typically stored in memory 614.

Consumer metamodel generator 611 facilitates generation of consumer metamodels 615. Consumer metamodels 615 store consumer characteristics for a set of devices 650 as a list of consumer attributes. Consumer metamodel generator 611 generally stores consumer metamodels 615 in memory 614. User interface device 620 may provide an interface to the user to generate and maintain consumer metamodels 615.

Consumer inventory manager 614 coordinates with the an information model (not shown) and consumer metamodel 615 to generate the device information and store the information in consumer store 617. The information model may be stored in memory 614. Consumer inventory manager 613 typically stores consumer store 617 in memory 614. Consumer store 617 essentially stores a list of devices 650, a list of consumer attributes for each of the devices 650 based on consumer metamodel 615 and one or more values for each consumer attribute. Consumer inventory manager 613 may download device information from the information model for mass registration of devices 650. The device information may include device attributes and values of the attributes. The device information may also be downloaded from a data object storing device information. Consumer store 617 typically stores information about devices 650 in a tabular format. Although a person skilled in the art may appreciate that data may be stored in various alternative manners.

Rule evaluation module 612 typically calculates the data to be distributed to devices 650 based upon the consumer attributes, values for consumer attributes and one or more distribution rules. Rule evaluation module 612 generates a subscription for each of the devices 650. The subscriptions for each of the devices 650 are maintained in subscription store 616 and stored in memory 614. The Distribution rules are typically maintained by an organization. The distribution rules identify the subset of information to be distributed to various devices 650 depending on the values of the individual consumer attributes combinations thereof. Thus the subscription of devices 650 exactly indicates the subset of information that needs to be distributed to each of the devices 650.

Based upon the device subscription, extractor 618 extracts required data from the consolidated data store (not shown). The extracted data is then distributed to the devices 650. Distribution middleware 610 may further include a data distribution engine (not shown) for receiving consumer requests for data distribution. The distribution engine may then check and validate user and device authorizations, communicating with subscription store 616 to pull out subscription for devices 650 requesting data distribution and distribute data to devices 650 based upon the subscriptions.

The particular methods associated with embodiments of the invention are described in terms of computer software and hardware with reference to a flowchart. The methods to be performed by a computing device (e.g., an application server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

Elements of the invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

What is claimed is:

1. A computer implemented method to distribute information, the method comprising:
   selecting a consumer meta model definition for a set of consumer devices from a plurality of consumer meta model definitions for separate sets of consumer devices, the consumer meta model definition including a consumer device attribute definition, wherein the consumer device attribute is selected from a group consisting of standard attributes, category attributes, configuration attributes and administration attributes;
   customizing the selected consumer meta model by editing the consumer device attribute definition of the consumer meta model via a tool for consumer meta model definition;
   registering a plurality of devices from the set of consumer devices by assigning at least one value to the edited consumer device attribute of the customized consumer meta model for each device of the plurality of devices;
   at a computing device, generating a subscription for a device of the plurality of registered devices based on the at least one value of the edited consumer device attribute and on at least one distribution rule maintained by an organization; and
   distributing a subset of information collected from at least one backend data source to the device, wherein the subset of the information is indicated by the subscription.

2. The method of claim 1, further comprising:
   generating the consumer meta model definition for the set of consumer devices via the tool for consumer metadata model definition.

3. The method of claim 1, wherein distributing the subset of information comprises:
   consolidating the information collected from the at least one backend data source into a consolidation data store; and
   extracting data from the consolidated data store based on the device subscription.

4. The method of claim 1, wherein generating the subscription for the device comprises:
   creating the at least one distribution rule based upon organizational requirements and on the selected consumer meta model definition.

5. The method of claim 1, wherein customizing the selected consumer meta model comprises one or more of adding an attribute and deleting an attribute.

6. The method of claim 1, wherein registering the plurality of devices comprises downloading organizational hierarchy information and device information from one or more of an information model store and from the at least one backend data source, where the device information is selected from a group consisting of device identifier, device category and default attributes.

7. The method of claim 1, wherein the standard attributes are selected from a group consisting of a receiver identifier, a receiver category and a receiver state.

8. The method of claim 1, wherein the category attributes are selected from the group consisting of a device name, a device sub category, a database identifier, a user identifier, an installed software component, an equipment number and a device framework type.

9. The method of claim 1, wherein registering the plurality of devices comprises reading data from a data object.

10. The method of claim 1, wherein registering the plurality of devices comprises storing the at least one value assigned to the attribute for each device of the plurality of devices in a device inventory.

11. The method of claim 1, wherein selecting the consumer meta model definition comprises searching for one or more consumer devices over the consumer device attribute definition using the plurality of consumer meta model definitions.

12. A system comprising:
    a consumer metamodel generator for generating a consumer metamodel definition for a set of consumer devices, the consumer metamodel definition including a consumer device attribute definition, wherein the consumer device attribute is selected from a group consisting of standard attributes, category attributes, configuration attributes and administration attributes, wherein the consumer metamodel is stored in a memory;
    a consumer metamodel modeling tool provided by a distribution middleware for customizing the consumer device attribute definition of the consumer metamodel;
    a consumer inventory manager for generating a registration for a plurality of devices from the set of consumer devices by downloading a device information including at least one value corresponding to the customized consumer device attribute of the consumer meta model for each device of the plurality of devices;
    a rule evaluation module for generating a subscription for a device of the plurality of registered devices based on the at least one value of the customized consumer device attribute and on at least one distribution rule maintained by an organization; and
    an extractor for distributing a subset of information collected from at least one backend data source to the device, wherein the subset of the information is indicated by the subscription.

13. The system of claim 12 further comprising a graphical user interface of the consumer metamodel modeling tool to receive the consumer metamodel definition for the set of consumer devices.

14. The system of claim 12 further comprising a consolidated data store to consolidate the information collected from the at least one backend data source, the consolidated data store is stored in the memory.

15. A machine-accessible medium which provides instructions that, when executed by a machine, causes the machine to perform operations comprising:
   generating a plurality of consumer meta model definitions for separate sets of consumer devices, where each consumer meta model definition of the plurality of consumer meta model definitions identifies a set of consumer devices from the separate sets of consumer devices and includes a consumer device attribute definition, wherein the consumer device attribute is selected from a group consisting of standard attributes, category attributes, configuration attributes and administration attributes;
   customizing a consumer device attribute definition of a consumer meta model of the plurality of consumer meta model definitions;
   registering a plurality of devices from a set of consumer devices defined by the consumer meta model, wherein the registering assigns at least one value to the customized consumer device attribute of the consumer meta model for each device of the plurality of devices;
   generating a subscription for a device of the plurality of registered devices based on the at least one value of the customized consumer device attribute and on at least one distribution rule maintained by an organization; and
   distributing a subset of information collected from at least one backend data source to the device, wherein the subset of the information is indicated by the subscription.

16. The machine-accessible medium of claim 15, further providing instructions which when executed by the machine causes the machine to perform further operations comprising selecting the consumer meta model definition from the plurality of consumer meta model definitions by searching for one or more consumer devices using the plurality of consumer meta model definitions.

17. The machine-accessible medium of claim 16, further providing instructions which when executed by the machine causes the machine to perform further operations comprising:
   consolidating the information collected from the at least one backend data source into a consolidation data store; and
   extracting data from a consolidated data store based on the device subscription.

18. The machine-accessible medium of claim 16, further providing instructions which when executed by the machine causes the machine to perform further operations comprising:
   identifying the at least one distribution rule based upon organizational requirements and on the selected consumer meta model definition.

19. The machine-accessible medium of claim 15, wherein the consumer device attribute includes organizational structures.

20. The machine-accessible medium of claim 15 wherein the standard attributes are selected from a group consisting of a receiver identifier, a receiver category and a receiver state, and wherein the category attributes are selected from the group consisting of a device name, a device sub category, a database identifier, a user identifier, an installed software component, an equipment number and a device framework type.

* * * * *